United States Patent
Wu et al.

(10) Patent No.: US 12,471,043 B2
(45) Date of Patent: Nov. 11, 2025

(54) WIRELESS COMMUNICATION METHOD AND TERMINAL DEVICE FOR ACQUIRING FREQUENCY DOMAIN RESOURCE INFORMATION

(71) Applicant: GUANGDONG OPPO MOBILE TELECOMMUNICATIONS CORP., LTD., Guangdong (CN)

(72) Inventors: Zuomin Wu, Guangdong (CN); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 436 days.

(21) Appl. No.: 18/059,372

(22) Filed: Nov. 28, 2022

(65) Prior Publication Data

US 2023/0090640 A1 Mar. 23, 2023

Related U.S. Application Data

(63) Continuation of application No. PCT/CN2020/093262, filed on May 29, 2020.

(51) Int. Cl.
*H04W 56/00* (2009.01)
*H04W 72/044* (2023.01)
(Continued)

(52) U.S. Cl.
CPC ....... *H04W 56/001* (2013.01); *H04W 72/044* (2013.01); *H04W 74/0808* (2013.01); *H04L 5/0058* (2013.01)

(58) Field of Classification Search
CPC ... H04W 56/00; H04W 56/001; H04W 72/00; H04W 72/04; H04W 72/044;
(Continued)

(56) References Cited

U.S. PATENT DOCUMENTS

2018/0124718 A1* 5/2018 Ng .................. H04W 56/001
2020/0177265 A1* 6/2020 Guan ............... H04B 7/088
(Continued)

FOREIGN PATENT DOCUMENTS

CN 108809558 11/2018
CN 111083732 4/2020
(Continued)

OTHER PUBLICATIONS

LG Electronics, "Discussion on physical layer structure for NR sidelink," 3GPP TSG RAN WG1 Meeting #100, R1-2000781, Feb. 2020.
(Continued)

*Primary Examiner* — Warner Wong
(74) *Attorney, Agent, or Firm* — Hodgson Russ LLP

(57) ABSTRACT

A wireless communication method and a terminal device are described. The method can comprise: acquiring frequency domain resource information corresponding to a first slot on a first frequency band, wherein the first frequency band comprises a first carrier or a first bandwidth part, the first slot corresponds to at least two frequency domain resources, the at least two frequency domain resources comprise a first frequency domain resource and a second frequency domain resource, the first frequency domain resource is used for transmitting a first synchronization signal block (SSB), and the second frequency domain resource is used for transmitting a first channel or a first signal. A first slot on a first frequency band corresponds to at least two frequency domain resources. The first frequency domain resource is used for transmitting a first SSB, and a second frequency domain resource is used for transmitting a first channel or a first signal.

15 Claims, 6 Drawing Sheets

First slot

(51) Int. Cl.
*H04W 74/0808* (2024.01)
*H04L 5/00* (2006.01)

(58) Field of Classification Search
CPC ......... H04W 72/0446; H04W 72/0453; H04W 72/0457; H04W 74/00; H04W 74/08; H04W 74/00808; H04W 72/50; H04L 5/003; H04L 5/0044; H04L 5/0058; H04L 2012/5631; H04L 2012/6456; H04L 47/70; H04L 47/78
See application file for complete search history.

(56) References Cited

U.S. PATENT DOCUMENTS

| | | | |
|---|---|---|---|
| 2021/0321384 A1* | 10/2021 | Osawa | H04W 72/20 |
| 2021/0360549 A1* | 11/2021 | Lee | H04W 56/006 |
| 2022/0015071 A1* | 1/2022 | Hui | H04W 72/56 |
| 2022/0061099 A1* | 2/2022 | Sun | H04L 5/0053 |
| 2022/0150849 A1* | 5/2022 | Zhao | H04L 27/2626 |
| 2022/0159693 A1* | 5/2022 | Zhou | H04W 72/23 |
| 2023/0007603 A1* | 1/2023 | Sui | H04W 72/0453 |
| 2023/0319745 A1* | 10/2023 | Liu | H04W 72/1263 370/503 |

FOREIGN PATENT DOCUMENTS

| | | |
|---|---|---|
| WO | 2020031384 A1 | 2/2020 |
| WO | 2020069659 | 4/2020 |
| WO | 2021237654 A1 | 12/2021 |

OTHER PUBLICATIONS

NTT Docomo, Inc., "Sidelink Synchronization Mechanism for NR V2X," 3GPP TSG RAN WG1 #96bis, R1-1905424, Apr. 2019.
Intel Corporation, "Sidelink Synchronization for NR V2X Communication," 3GPP TSG RAN WG1 Meeting #98bis, R1-1910651, Oct. 2019.
CATT, "Sidelink synchronization mechanism in NR V2X," 3GPP TSG RAN WG1 Meeting #98bis, R1-1910330, Oct. 2019.
WIPO, International Search Report and Written Opinion for PCT/CN2020/093262, Feb. 20, 2021.

* cited by examiner

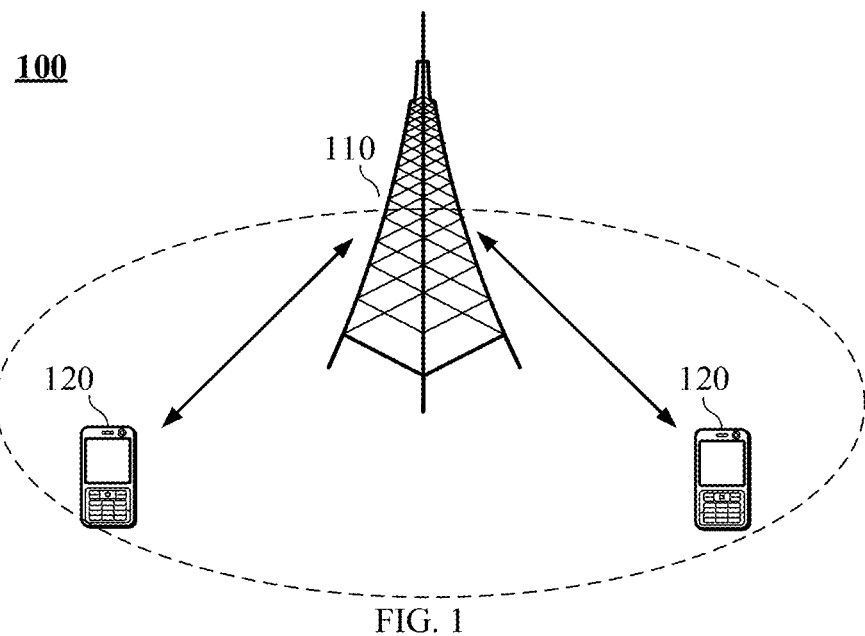
FIG. 1
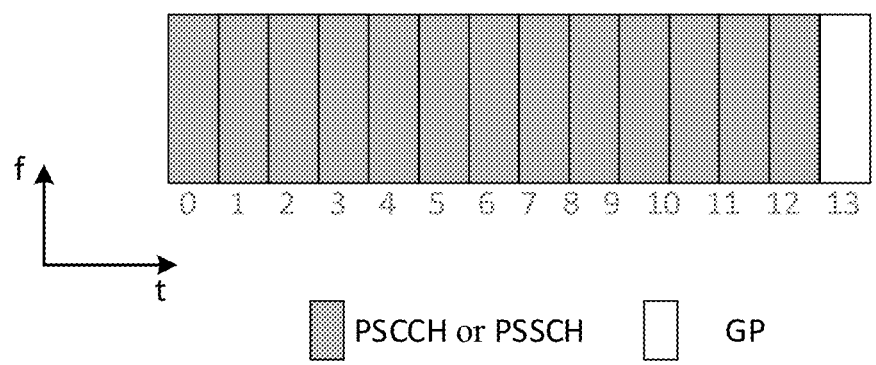
FIG. 2
FIG. 3

First slot

WIRELESS COMMUNICATION METHOD AND TERMINAL DEVICE FOR ACQUIRING FREQUENCY DOMAIN RESOURCE INFORMATION

CROSS-REFERENCE

This application is a continuation of International Patent Application No. PCT/CN2020/093262, filed May 29, 2020, the entire disclosure of which is incorporated herein by reference.

TECHNICAL FIELD

The present disclosure relates to the field of communications, and more particularly, to a wireless communication method and terminal device.

BACKGROUND

Device to Device (D2D) communication is a transmission technology based on Sidelink (SL). An example of a D2D system is a Vehicle to Everything (V2X) system. Different from traditional cellular systems in which communication data is received or transmitted through a base station, the D2D system employs terminal-to-terminal direct communication, and thus has higher spectral efficiency and lower transmission delay.

In the SL system, on a slot used for transmission and reception of a sidelink synchronization signal by a terminal device, other transmissions cannot be performed, which is likely to bring about a large performance loss.

SUMMARY

Embodiments of the present disclosure provide a wireless communication method and terminal device.

An embodiment of the present disclosure provides a wireless communication method, including:
  obtaining, by a terminal device, frequency domain resource information corresponding to a first slot in a first frequency band;
  wherein the first frequency band comprises a first carrier or a first bandwidth part (BWP), the first slot corresponds to at least two frequency domain resources, and the at least two frequency domain resources comprises a first frequency domain resource and a second frequency domain resource, the first frequency domain resource is used for transmission of a first Synchronization Signal/PBCH Block (SSB), and the second frequency domain resource is used for transmission of a first channel or a first signal.

An embodiment of the present disclosure provides a wireless communication method, including:
  obtaining, by a terminal device, frequency domain resource information corresponding to a first slot in a first frequency band,
  wherein the first frequency band comprises a first carrier or a first bandwidth part (BWP), the first slot corresponds to at least two frequency domain resources, and the at least two frequency domain resources comprises a first frequency domain resource and a second frequency domain resource, the first frequency domain resource is used for transmission of a first Synchronization Signal/PBCH Block (SSB), and the second frequency domain resource is used for transmission of a first channel or a first signal; and
  detecting, by the terminal device, the first SSB through the first frequency domain resource, and/or receiving, by the terminal device, the first channel or the first signal through the second frequency domain resource.

An embodiment of the present disclosure provides a terminal device, including:
  an obtaining unit, configured to obtain frequency domain resource information corresponding to a first slot in a first frequency band;
  wherein the first frequency band comprises a first carrier or a first bandwidth part (BWP), the first slot corresponds to at least two frequency domain resources, and the at least two frequency domain resources comprises a first frequency domain resource and a second frequency domain resource, the first frequency domain resource is used for transmission of a first Synchronization Signal/PBCH Block (SSB), and the second frequency domain resource is used for transmission of a first channel or a first signal.

An embodiment of the present disclosure provides a terminal device, including:
  an obtaining unit, configured to obtain frequency domain resource information corresponding to a first slot in a first frequency band;
  wherein the first frequency band comprises a first carrier or a first bandwidth part (BWP), the first slot corresponds to at least two frequency domain resources, and the at least two frequency domain resources comprises a first frequency domain resource and a second frequency domain resource, the first frequency domain resource is used for transmission of a first Synchronization Signal/PBCH Block (SSB), and the second frequency domain resource is used for transmission of a first channel or a first signal, and
  a processing unit, configured to detect the first SSB through the first frequency domain resource, and/or receive the first channel or the first signal through the second frequency domain resource.

An embodiment of the present disclosure provides a terminal device, including a processor and a memory. The memory is configured to store a computer program, and the processor is configured to call and run the computer program stored in the memory to cause the terminal device to perform the above-mentioned wireless communication method.

An embodiment of the present disclosure provides a chip for implementing the above wireless communication method.

Specifically, the chip includes: a processor, configured to call and run a computer program from a memory to cause a device installed with the chip to perform the wireless communication method as described above.

An embodiment of the present disclosure provides a computer-readable storage medium for storing a computer program which, when being executed by a device, causes the device to perform the above-mentioned wireless communication method.

An embodiment of the present disclosure provides a computer program product including computer program instructions that cause a computer to perform the wireless communication method as described above.

An embodiment of the present disclosure provides a computer program which, when running on a computer, causes the computer to perform the above-mentioned wireless communication method.

BRIEF DESCRIPTION OF THE DRAWINGS

FIG. 1 is a schematic diagram of an application scenario according to an embodiment of the present disclosure.

FIG. 2 is a schematic flowchart of a wireless communication method according to an embodiment of the present disclosure.

FIG. 3 is a schematic diagram of a guard interval of a slot of D2D communication.

DETAILED DESCRIPTION

Figure 4:
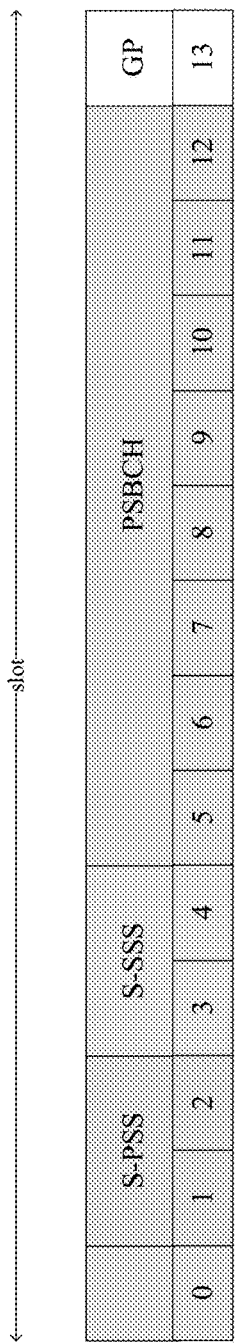
FIG. 4 is a schematic diagram of an S-SSB structure in a slot.

The technical solutions in the embodiments of the present disclosure will be described below in conjunction with the drawings in the embodiments of the present disclosure.

The technical solutions of the embodiments of the present disclosure can be applied to various communication systems such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, a Non-Terrestrial Networks (NTN) system, a Universal Mobile Telecommunication System (UMTS), Wireless Local Area Networks (WLAN), a Wireless Fidelity (WiFi), a 5th-Generation (5G) communication system or other communication systems.

Generally, traditional communication systems support a limited number of connections and are easy to implement. However, with the development of communication technologies, mobile communication systems will not only support traditional communications, but will also support, for example, Device to Device (D2D) communication, Machine to Machine (M2M) communication, Machine Type Communication (MTC), Vehicle to Vehicle (V2V) communication, Vehicle to Everything (V2X) communication, etc. The embodiments of the present disclosure can also be applied to these communication systems.

Optionally, the communication system in the embodiments of the present disclosure can be applied to a Carrier Aggregation (CA) scenario, a Dual Connectivity (DC) scenario, or a Standalone (SA) deployment scenario.

Optionally, the communication system in the embodiments of the present disclosure may be applied to an unlicensed spectrum, where the unlicensed spectrum may also be considered as a shared spectrum; or, the communication system in the embodiments of the present disclosure may also be applied to a licensed spectrum, where the licensed spectrum can also be considered an unshared spectrum.

Various embodiments are described in conjunction with the network device and the terminal device in the embodiments of the present disclosure, where terminal device may also be referred to as User Equipment (UE), an access terminal, a subscriber unit, a subscriber station, a mobile station, a remote station, a remote terminal, a mobile device, a user terminal, a terminal, a wireless communication device, a user agent, a user device, or the like.

The terminal device may be a station (ST) in the WLAN, or may be a cellular phone, a cordless phone, a Session Initiation Protocol (SIP) phone, a Wireless Local Loop (WLL) station, a Personal Digital Assistant (PDA) device, a handheld devices with wireless communication capabilities, a computing device or other processing devices connected to a wireless modem, an in-vehicle device, a wearable device, a terminal device in next-generation communication systems such as a NR network, or a terminal device in a future evolved public land mobile network (PLMN) network, etc.

In the embodiments of the present disclosure, the terminal device can be deployed on land, including indoor or outdoor, handheld, wearable, or vehicle-mounted; or it can be deployed on water (such as on a ship, etc.); or it can be deployed in the air (such as on an airplane, a balloon, a satellite, etc.).

In the embodiments of the present disclosure, the terminal device may be a Mobile Phone, a Pad, a computer with a wireless transceiving function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example instead of a limitation, in the embodiments of the present disclosure, the terminal device may also be a wearable device. The wearable device can also be referred to as a wearable smart device, which is a general term for wearable devices which are designed and developed by using wearable technology to intelligently design and develop everyday wear, such as glasses, gloves, watches, clothing and shoes. The wearable device is a portable device that is directly worn on the body or integrated into user's clothes or accessories. The wearable device is not only a hardware device, but also realizes powerful functions through software support, data interaction, and cloud interaction. In a broad sense, the wearable smart device includes full-featured and large-sized devices of which complete or partial functions can be achieved without relying on smart phones, such as smart watches or smart glasses, and devices which focus on only a certain type of application function and need to cooperate with other devices such as smart phones, such as various smart bracelets and smart jewelry for physical sign monitoring.

In the embodiments of the present disclosure, the network device can be a device used to communicate with a mobile device. The network device can be an Access Point (AP) in WLAN, a Base Transceiver Station (BTS) in GSM or CDMA, or a NodeB (NB) in WCDMA, and can also be an Evolutional Node B (eNB or eNodeB) in LTE, a relay station, an access point, a vehicle-mounted device, a wearable device, a network device (gNB) in a NR network, a network device in future evolutional PLMN network, a network device in a NTN network, or the like.

As an example but not a limitation, in the embodiments of the present disclosure, the network device may have a mobile feature, for example, the network device may be a moving device. Optionally, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, etc. Optionally, the network device may also be a base station that is set in a location such as on land or in water.

In the embodiments of the present disclosure, the network device may provide services for a cell, and the terminal device communicates with the network device through transmission resources (for example, frequency domain resources, or spectrum resources) used by the cell. The cell may be a cell corresponding to the network device (e.g., a cell corresponding to the base station), or belong to a macro base station or a base station corresponding to a small cell. The small cell herein can include a Metro cell, a Micro cell, a Pico cell, a Femto cell and so on, which are characterized in small coverage and low transmission power, and are suitable for providing high-rate data transmission services.

FIG. 1 exemplarily shows a communication system 100. The communication system includes one network device 110 and two terminal devices 120. Optionally, the communication system 100 may include multiple network devices 110, and other numbers of terminal devices 120 may be included in the coverage of each network device 110, which is not limited in the embodiments of the present disclosure.

Optionally, the communication system 100 may further include other network entities such as a mobility management entity (MME), and an Access and Mobility Management Function (AMF), which is not limited in the embodiments of the present disclosure.

The network device may further include an access network device and a core network device. That is, the wireless communication system further includes a plurality of core networks for communicating with the access network device. The access network device may be a long-term evolution (LTE) system, a next-generation radio (NR) system, or an evolutional node B (referred to as eNB or e-NodeB for short) in an authorized auxiliary access long-term evolution (LAA-LTE) system, a macro base station, a micro base station (also called "small base station"), a pico base station, an access point (AP), a transmission point (TP) or a new generation base station Node B (gNodeB), etc.

It should be understood that the device with a communication function in the network and/or system in the embodiments of the present disclosure may be referred to as the communication device. Taking the communication system shown in FIG. 1 as an example, the communication device may include a network device and terminal devices which have the communication function. The network device and the terminal devices may be the specific devices as described in the embodiments of the present disclosure, which will not be repeated here. The communication device may also include other devices in the communication system, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

It should be understood that "indicate" mentioned in the embodiments of the present disclosure may be directly indicating or indirectly indicating, or may represent an associated relationship. For example, if A indicates B, it may represent that A directly indicates B, for example, B can be obtained from A; or it may represent that A indicates B indirectly, for example, A indicates C, and B can be obtained from C; or it may represent that there is an associated relationship between A and B.

In the description of the embodiments of the present disclosure, the term "corresponding" may indicate that there is a direct or indirect corresponding relationship between two objects, or may indicate that there is an associated relationship, a relationship of indicating and being indicated, or a relationship of configuring and being configured between the two objects.

In order to facilitate the understanding of the technical solutions of the embodiments of the present disclosure, the relevant technologies of the embodiments of the present disclosure are described below. The following relevant technologies can be arbitrarily combined with the technical solutions of the embodiments of the present disclosure as optional solutions, which all fall within the protection scope of the embodiments of the present disclosure.

FIG. 2 is a schematic flowchart of a wireless communication method 200 according to an embodiment of the present disclosure. The method can optionally be applied to the system shown in FIG. 1, but it is not limited thereto. For example, it can optionally be applied to a system that includes only communication between terminal devices. The method includes at least some of the following contents.

In S210, a terminal device obtains frequency domain resource information corresponding to a first slot in a first frequency band.

The first frequency band includes a first carrier or a first bandwidth part (BWP), the first slot corresponds to at least two frequency domain resources, and the at least two frequency domain resources include a first frequency domain resource and a second frequency domain resource, the first frequency domain resource is used for transmission of a first Synchronizing Signal/PBCH Block (SSB), and the second frequency domain resource is used for transmission of a first channel or a first signal.

Exemplarily, the terminal device in the embodiments of the present disclosure may be a device in a sidelink system such as a D2D system. In the D2D system, a terminal device sends sidelink data, and other surrounding terminal devices can receive the sidelink data. The terminal device that sends data may be different at different times. Therefore, the terminal device sends data in a first slot, and needs to receive data sent by other terminal devices in a second slot, and thus the last symbol of each slot is used as a Guard period (GP), no data is transmitted within this symbol and this symbol is used for the terminal device to perform reception-transmission (or transmission-reception) conversion, as shown in FIG. 3.

In the NR SL system, as shown in FIG. 4, a slot may include a Sidelink Synchronization Signal/Physical Sidelink Broadcast Channel Block (S-SS/PSBCH Block, or S-SSB). One S-SSB includes 11 Resource Blocks (RBs) in frequency domain. In time domain, a Sidelink Primary Synchronization Signal (S-PSS) and a Sidelink Secondary Synchronization Signal (S-SSS) each includes two symbols, a Physical Sidelink Broadcast Channel (PSBCH) includes 9 symbols, that is, symbol 0 and symbol 5 to symbol 12, and the last symbol is GP, which is used for transmission-reception conversion or reception-transmission conversion.

Figure 5:
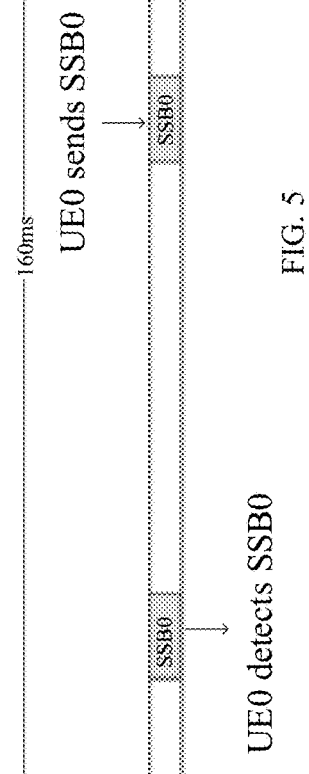
FIG. 5 is a schematic diagram of an S-SSB transmitted by a terminal device.

Exemplarily, an S-SSB transmission period may be 160 ms. For one S-SSB, two S-SSB resources may be included in one S-SSB transmission period. The terminal device performs S-SSB detection on one S-SSB resource, and after detecting the S-SSB, forwards the detected S-SSB on the other S-SSB resource. FIG. 5 shows an example in the case where one S-SSB is included in each S-SSB transmission period.

With the evolution of the SL systems, device-to-device transmissions may be supported on a shared spectrum. In this case, the terminal device needs to send S-SSB on the shared spectrum. Assuming that a carrier on the shared spectrum is a wideband carrier, the wideband carrier includes a plurality of RB sets. When it is restricted that the terminal device cannot send or receive other physical channels/signals on the slot where the S-SSB is sent or received, it will cause a relative large performance loss. The present disclosure can provide enhancement in such scenario. The terminal device can determine, depending on specific conditions, whether to perform reception or transmission of other channels or signals on the slot used by the terminal device to send or receive the S-SSB.

Optionally, in the embodiments of the present disclosure, obtaining the frequency domain resource information corresponding to the first slot in the first frequency band by the terminal device includes: obtaining, by the terminal device according to indication information from a network device or a terminal device having control authority, the frequency domain resource information corresponding to the first slot in the first frequency band; or obtaining, by the terminal device according to a protocol agreement or a preset value, the frequency domain resource information corresponding to the first slot in the first frequency band.

Optionally, in the embodiments of the present disclosure, the first frequency band includes the first carrier on a shared spectrum, or the first frequency band includes the first BWP on the shared spectrum.

Optionally, in the embodiments of the present disclosure, the first SSB includes a Sidelink SSB (S-SSB).

Optionally, in the embodiments of the present disclosure, the first channel includes at least one of a Physical Sidelink Control Channel (PSCCH), a Physical Sidelink Share Channel (PSSCH), a Physical Sidelink Feedback Channel (PSFCH), a Physical Uplink Control Channel (PUCCH), a Physical Uplink Shared Channel (PUSCH), or a Physical Random Access Channel (PRACH).

Optionally, in the embodiments of the present disclosure, the first signal includes a reference signal. For example, the first signal includes at least one of a measurement reference signal and a demodulation reference signal.

Optionally, in the embodiments of the present disclosure, the first frequency domain resource and the second frequency domain resource do not overlap in the frequency domain.

Optionally, in the embodiments of the present disclosure, the first frequency band includes a resource block (RB) set in the frequency domain, and the first frequency domain resource and the second frequency domain resource are frequency-division multiplexed in the RB set.

Optionally, in the embodiments of the present disclosure, the method further includes:
  when the terminal device determines not to send or receive the first SSB on the first slot and the terminal device succeeds in channel detection on a channel corresponding to the RB set, the terminal device sends the first channel or the first signal through the second frequency domain resource in the RB set, or
  when the terminal device determines not to send or receive the first SSB on the first slot, and the terminal device fails the channel detection on the channel corresponding to the RB set, the terminal device does not send the first channel or the first signal through the second frequency domain resource in the RB set.

Exemplarily, on the shared spectrum, when UE1 succeeds in channel detection (or referred to as Listen Before Talk, LBT) on the channel corresponding to the RB set, UE1 sends PSCCH and PSSCH to UE2 through the second frequency domain resource in the RB set. When UE1 fails the LBT on the channel corresponding to the RB set, UE1 does not send the PSCCH and PSSCH to UE2 through the second frequency domain resource in the RB set. For another example, when UE1 succeeds in the LBT on the channel corresponding to the RB set, UE1 sends PUCCH to the network device through the second frequency domain resource in the RB set. When UE1 fails the LBT on the channel corresponding to the RB set, UE1 does not send the PUCCH to the network device through the second frequency domain resource in the RB set.

The shared spectrum in the above example includes an unlicensed spectrum. The unlicensed spectrum is a spectrum divided by countries and regions that can be used for radio device communication, and this spectrum is generally considered to be a shared spectrum, that is, communication devices in different communication systems can use this spectrum as long as they meet national or regional regulations set up on the spectrum, without the need to apply to the government for a proprietary spectrum authorization.

In order to enable various communication systems that use unlicensed spectrum for wireless communication to coexist amicably on this spectrum, some countries or regions have stipulated regulatory requirements that must be met when using unlicensed spectrum. For example, a communication device follows the principle of "listen before talk (LBT)", that is, before a communication device sends a signal on a channel of the unlicensed spectrum, it needs to perform channel listening first, and only when a result of the channel listening is that the channel is idle, the communication device can send the signal; and if the result of the channel listening by the communication device on the channel of the unlicensed spectrum is that the channel is busy, the communication device cannot send the signal. For another example, in order to ensure fairness, in one transmission, the duration that the communication device uses the channel of the unlicensed spectrum for signal transmission cannot exceed a certain duration. For another example, in order to avoid that the power of the signal transmitted on the channel of the unlicensed spectrum is too large and affects the transmission of other important signals on the channel, the communication device needs to follow the restriction that it does not exceed the maximum power spectrum density when using the channel of the unlicensed spectrum for signal transmission.

Figure 6:
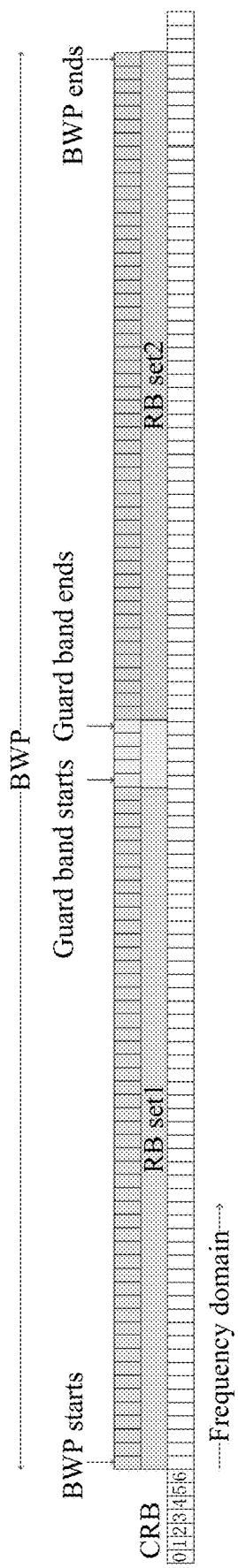
FIG. 6 is a schematic diagram of a RB set configuration in a bandwidth case.

On the shared spectrum, due to the large bandwidth, one carrier may include a large bandwidth such as 80 MHz. In broadband resource configuration, the concept of the RB set is introduced, where one RB set includes a group of consecutive RBs, and one RB set corresponds to at least one LBT bandwidth, for example, one RB set corresponds to one LBT bandwidth. The LBT bandwidth may refer to a bandwidth in which the communication device performs the LBT, for example, one LBT bandwidth is 20 MHz. The network device may configure at least one RB set for the terminal device. When the network device configures multiple RB sets for the terminal device, there is a guard band in the carrier between two adjacent RB sets, and the guard band in the carrier includes an integer number of RBs. One BWP may include an integer number of RB sets. For example, a schematic diagram of the RB set configuration in the broadband case is shown in FIG. 6.

The signal transmission may occur within the RB set. When two adjacent RB sets are both used for signal transmission, signal transmission may occur in the guard band between the two adjacent RB sets, otherwise, signal transmission cannot occur in the guard band between the two adjacent RB sets. On the shared spectrum, if the terminal device needs to send S-SSB, since the bandwidth of S-SSB is usually smaller than the bandwidth corresponding to one RB set, S-SSB should be transmitted through one RB set.

Optionally, in the embodiments of the present disclosure, the first frequency band includes at least two RB sets in the frequency domain, the at least two RB sets include a first RB set and a second RB set, the first frequency domain resource is located in the first RB set, and the second frequency domain resource is located in the second RB set.

Optionally, in the embodiments of the present disclosure, in the case where the first frequency band includes at least two RB sets in the frequency domain, the method further includes at least one of the following:
when the terminal device succeeds in channel detection on a channel corresponding to the first RB set, the terminal device sends the first SSB through the first frequency domain resource in the first RB set;
when the terminal device succeeds in channel detection on a channel corresponding to the second RB set, the terminal device sends the first channel or the first signal through the second frequency domain resource in the second RB set.

Optionally, in the embodiments of the present disclosure, in the case where the first frequency band includes at least two RB sets in the frequency domain, the method further includes at least one of the following:
when the terminal device fails the channel detection on the channel corresponding to the first RB set, the terminal device does not send the first SSB through the first frequency domain resource in the first RB set;
when the terminal device fails the channel detection on the channel corresponding to the second RB set, the terminal device does not send the first channel or the first signal through the second frequency domain resource in the second RB set.

Optionally, the above-described embodiments may be applied to a terminal device capable of simultaneously transmitting multiple channels.

Optionally, in the embodiments of the present disclosure, in the case where the first frequency band includes at least two RB sets in the frequency domain, the method further includes the following:
when the terminal device succeeds in the channel detection on the channel corresponding to the first RB set, the terminal device sends the first SSB through the first frequency domain resource in the first RB set; or
when the terminal device fails the channel detection on the channel corresponding to the first RB set, and the terminal device succeeds in the channel detection on the channel corresponding to the second RB set, the terminal device sends the first channel or the first signal through the second frequency domain resource in the second RB set.

In this embodiment, it can be considered that a priority of the first SSB transmission is higher than a priority of the first channel or first signal transmission. Therefore, when the terminal device can transmit the first SSB, it preferentially transmits the first SSB; and when the terminal device fails the LBT on the channel corresponding to the first SSB resource, the terminal device may transmit the first channel or the first signal in the case where the terminal device succeeds in the LBT on the channel corresponding to the second frequency domain resource.

Optionally, the above-described embodiments may be applied to a terminal device that is not capable of simultaneously transmitting multiple channels.

Optionally, in the embodiments of the present disclosure, in the case where the first frequency band includes at least two RB sets in the frequency domain, the method further includes the following:
when the terminal device determines not to send or receive the first SSB on the first slot, and the terminal device succeeds in the channel detection on the channel corresponding to the second RB set, the terminal device sends the first channel or the first signal through the second frequency domain resource in the second RB set.

Optionally, in the embodiments of the present disclosure, the method further includes:
when the terminal device determines not to send or receive the first SSB on the first slot, and the terminal device succeeds in the channel detection in the first frequency band, the terminal device sends the first channel or the first signal through the second frequency domain resource; or,
when the terminal device determines not to send or receive the first SSB on the first slot, and the terminal device fails the channel detection in the first frequency band, the terminal device does not send the first channel or the first signal through the second frequency domain resource.

Optionally, in the embodiments of the present disclosure, the method further includes:
when the terminal device determines not to send or receive the first SSB on the first slot, the terminal device sends the first channel or the first signal through the second frequency domain resource; or,
when the terminal device determines to send or receive the first SSB on the first slot, the terminal device does not send the first channel or the first signal through the second frequency domain resource.

Optionally, the above embodiments can be applied to the licensed spectrum or unshared spectrum, that is, the terminal device can perform transmission without performing channel detection.

Optionally, in the embodiments of the present disclosure, the terminal device determines not to send or receive the first SSB on the first slot, including at least one of the following:

the terminal device sends or receives the first SSB through a second slot, where the second slot and the first slot belong to the same SSB transmission period;

the terminal device does not detect the first SSB on a third frequency domain resource on a third slot, where the third frequency domain resource and the first frequency domain resource include paired SSB resources, and the third slot and the first slot belong to the same SSB transmission period.

Optionally, in the embodiments of the present disclosure, that the terminal device determines not to send or receive the first SSB on the first slot further includes that the terminal device corresponds to a highest synchronization priority, or the terminal device is a terminal device that has a second highest synchronization priority.

Optionally, the second slot includes a slot on the first frequency band as described above.

Optionally, the third slot includes a slot on the first frequency band as described above.

Optionally, since GNSS has the highest synchronization priority, if the terminal device can obtain synchronization from the GNSS, the terminal device corresponds to the highest synchronization priority, or the terminal device is a terminal device with the second highest synchronization priority.

In the embodiments of the present disclosure, the SSB transmission period may include a period corresponding to the SSB resource used for transmission of the SSB. One SSB transmission period may include at least one group of paired SSB resources. For example, one group of paired SSB resources includes a first SSB resource and a second SSB resource, the first SSB resource and the second SSB resource may correspond to the same SSB index, or the first SSB resource and the second SSB resource may be used to transmit the SSBs with the same SSB index. The UE may detect the SSB on the first SSB resource, and forward the detected SSB on the second SSB resource. Alternatively, the UE may detect the SSB on the second SSB resource, and forward the detected SSB on the first SSB resource. For example, if the UE detects a certain SSB index on the first SSB resource, the UE sends the SSB corresponding to the SSB index on the second SSB resource.

Optionally, the SSB transmission period may be an S-SSB transmission period. For example, one S-SSB transmission period is 160 ms. The two S-SSB resources included in the S-SSB transmission period are paired SSB resources. After detecting the S-SSB on one S-SSB resource, the terminal device can send the detected S-SSB on the other S-SSB resource.

In one example, in the first frequency band, one SSB transmission period includes slots t1, t2, t3 and t4. The SSB resources (i.e., the first frequency domain resources) on the slots t1, t2, t3 and t4 can be used to transmit the first SSB. UE1 transmits the first SSB on the SSB resource of slot t1, then the slot t1 can be an example of the second slot as described above, and the slots t2, t3 and t4 can be examples of the first slot as described above. UE1 determines not to send or receive the first SSB on the SSB resources on the slot t2, t3 or t4.

In another example, in the first frequency band, one SSB transmission period includes slots t1 and t2, and the SSB resource on the slot t1 is paired with the SSB resource on the slot t3. For example, if UE1 does not detect a certain SSB index on the SSB resource of the slot t1, UE1 does not transmit the SSB on the SSB resource of the slot t2. The slot t1 may be an example of the above-mentioned third slot, and the slot t2 may be an example of the above-mentioned first slot.

In another example, in the first frequency band, one SSB transmission period includes slots t1, t2, t3 and t4, the SSB resource on the slot t1 is paired with the SSB resource on the slot t3, and the SSB resource on the slot t2 is paired with the SSB resource on the slot t4. For example, if UE1 detects an index of a certain SSB on the SSB resource of the slot t1, UE1 sends the SSB on the SSB resource of the slot t3. For example, if UE1 does not detect an index of a certain SSB on the SSB resource of the slot t2, UE1 does not send the SSB on the SSB resource of the slot t4. The slot t2 may be an example of the above-mentioned third slot, and the slot t4 may be an example of the above-mentioned first slot.

In another example, if the terminal device can obtain synchronization from a Global Navigation Satellite System (GNSS) with the highest synchronization priority, it means that the terminal device has the second highest synchronization priority. Therefore, the terminal device does not need to receive any synchronization signal sent by other terminal devices. Accordingly, the terminal device determines not to send or receive the synchronization signal on the first slot.

In the embodiments of the present disclosure, the first slot in the first frequency band corresponds to at least two frequency domain resources, the first frequency domain resource is used to transmit the first SSB, and the second frequency domain resource is used to transmit the first channel or the first signal, and thus other channels or signals can be transmitted on the frequency domain resources not used for SSB transmission on the first slot, thereby improving the resource utilization rate of wireless communication. For example, when applying the method in the embodiments of the present disclosure to the shared spectrum, it can improve the resource utilization rate on the shared spectrum.

Figure 7:
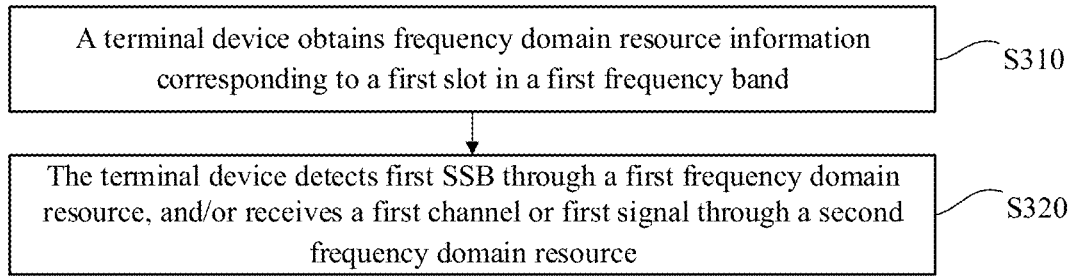
FIG. 7 is a schematic flowchart of a wireless communication method according to another embodiment of the present disclosure.

FIG. 7 is a schematic flowchart of a wireless communication method 300 according to an embodiment of the present disclosure. The method can optionally be applied to the system as shown in FIG. 1, but it is not limited thereto. The method includes at least some of the following contents.

In S310, a terminal device obtains frequency domain resource information corresponding to a first slot in a first frequency band.

The first frequency band includes a first carrier or a first bandwidth part (BWP), the first slot corresponds to at least two frequency domain resources, and the at least two frequency domain resources include a first frequency domain resource and a second frequency domain resource, the first frequency domain resource is used for transmission of a first synchronization signal block (SSB), and the second frequency domain resource is used for transmission of a first channel or a first signal.

In S320, the terminal device detects the first SSB through the first frequency domain resource, and/or receives the first channel or the first signal through the second frequency domain resource.

Optionally, in the embodiments of the present disclosure, the first SSB includes a Sidelink SSB (S-SSB).

Optionally, in the embodiments of the present disclosure, the first frequency domain resource and the second frequency domain resource do not overlap in the frequency domain.

Optionally, in the embodiments of the present disclosure, the first frequency band includes a resource block (RB) set in the frequency domain, and the first frequency domain resource and the second frequency domain resource are frequency-division multiplexed in the RB set.

Exemplarily, the terminal device that performs the wireless communication method 300 in the embodiments may be a terminal device on a receiving side of the terminal device that performs the above-mentioned wireless communication method 200.

It is assumed that the terminal device on a sending side is a first terminal, and the terminal device on a receiving side is a second terminal. In the case where the first frequency band includes an RB set in the frequency domain, when the first terminal determines not to send or receive the first SSB on the first slot, and the terminal device succeeds in channel detection on a channel corresponding to the RB set, the first terminal sends the first channel or the first signal through the second frequency domain resource in the RB set; correspondingly, the second terminal can receive the first channel or the first signal through the second frequency domain resource. Or, when the first terminal determines not to send or receive the first SSB on the first slot, and the terminal device fails the channel detection on the channel corresponding to the RB set, the first terminal does not send the first channel or the first signal through the second frequency domain resource in the RB set. Correspondingly, the second terminal cannot receive the first channel or the first signal through the second frequency domain resource.

Optionally, in the embodiments of the present disclosure, the first frequency band includes at least two RB sets in the frequency domain, the at least two RB sets include a first RB set and a second RB set, the first frequency domain resource is located in the first RB set, and the second frequency domain resource is located in the second RB set.

In the case where the first frequency band includes at least two RB sets in the frequency domain, there can be at least one of the following processing behaviors.

Behavior 1, which can include at least one of the following:
  when the first terminal succeeds in channel detection on the channel corresponding to the first RB set, the first terminal sends the first SSB through the first frequency domain resource in the first RB set, and correspondingly, the second terminal can receive the first SSB through the first frequency domain resource; and/or, when the first terminal succeeds in the channel detection on the channel corresponding to the second RB set, the first terminal sends first channel or the first signal through the second frequency domain resource in the second RB set, and correspondingly, the second terminal can receive the first channel or the first signal through the second frequency domain resource,
  when the first terminal fails the channel detection on the channel corresponding to the first RB set, the first terminal does not send the first SSB through the first frequency domain resource in the first RB set, and correspondingly, the second terminal cannot receive the first SSB through the first frequency domain resource; and/or, when the first terminal fails the channel detection on the channel corresponding to the second RB set, the first terminal does not send the first channel or the first signal through the second frequency domain resource in the second RB set, and correspondingly, the second terminal cannot receive the first channel or the first signal through the second frequency domain resource.

Behavior 2, which can include:
  when the first terminal succeeds in the channel detection on the channel corresponding to the first RB set, the first terminal sends the first SSB through the first frequency domain resource in the first RB set, and correspondingly, the second terminal can receive the first SSB through the first frequency domain resource; or,
  when the first terminal fails the channel detection on the channel corresponding to the first RB set, and the first terminal succeeds in the channel detection on the channel corresponding to the second RB set, the first terminal sends the first channel or the first signal through the second frequency domain resource in the second RB set, and correspondingly, the second terminal can receive the first channel or the first signal through the second frequency domain resource.

Behavior 3, which can include:
  when the first terminal determines not to send or receive the first SSB on the first slot, and the first terminal succeeds in the channel detection on the channel corresponding to the second RB set, the first terminal sends the first channel or the first signal through the second frequency domain resource in the second RB set, and correspondingly, the second terminal can receive the first channel or the first signal through the second frequency domain resource.

Optionally, in the embodiments of the present disclosure, the first channel includes at least one of a physical sidelink control channel (PSCCH), a physical sidelink shared channel (PSSCH), a physical sidelink feedback channel (PSFCH), a physical uplink control channel (PUCCH), a physical uplink shared channel (PUSCH), and a physical random access channel (PRACH).

Optionally, in the embodiments of the present disclosure, the first frequency band includes the first carrier on a shared spectrum, or the first frequency band includes the first BWP on the shared spectrum.

For specific examples of the terminal device performing the method 300 in the embodiments, reference can be made to the relevant description with respect to the foregoing method 200, which will not be repeated here for the sake of brevity.

The following is an example of an application scenario, which can include some or all of the following contents.

The first slot on the first carrier in the shared spectrum corresponds to at least two frequency domain resources, the at least two frequency domain resources include a first frequency domain resource and a second frequency domain resource, the first frequency domain resource is used to transmit a first synchronization signal/PBCH block (SSB), and the second frequency domain resource is used to transmit a first channel or a first signal.

Exemplarily, the first channel may include at least one of the following physical channels: a PSCCH, a PSSCH, a PSFCH, a PUCCH, a PUSCH, and a PRACH.

Figure 8:
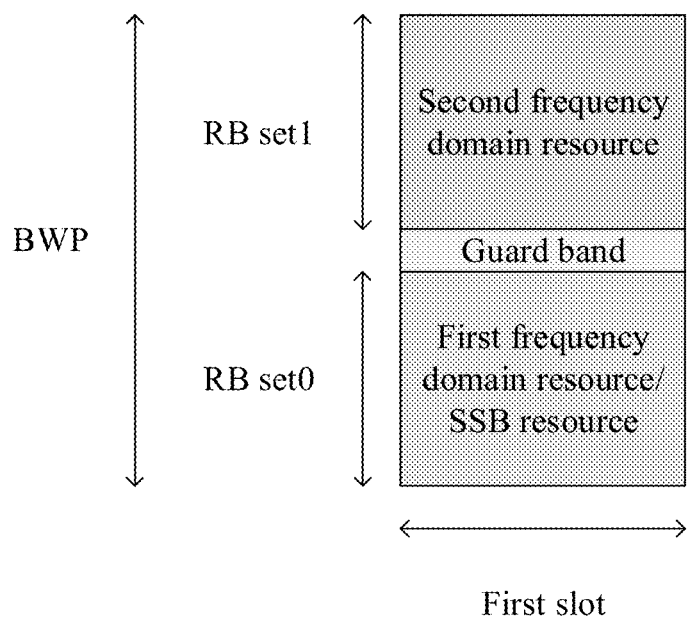
FIG. 8 is a schematic diagram showing a first carrier including two RB sets in frequency domain.

Case 1: The first carrier or BWP includes at least two RB sets in the frequency domain, the at least two RB sets include a first RB set and a second RB set, the first frequency domain resource is located in the first RB set, and the second frequency domain resource is located in the second RB set. As shown in FIG. 8, the first frequency domain resource is an SSB resource that can be used to transmit the first SSB. The first frequency domain resource is located in a RB set 0, and the second frequency domain resource is located in a RB set 1. There is a guard band between the first frequency domain resource and the second frequency domain resource. The first frequency domain resource and the second frequency domain resource are on the first slot of the first carrier.

Figure 9:
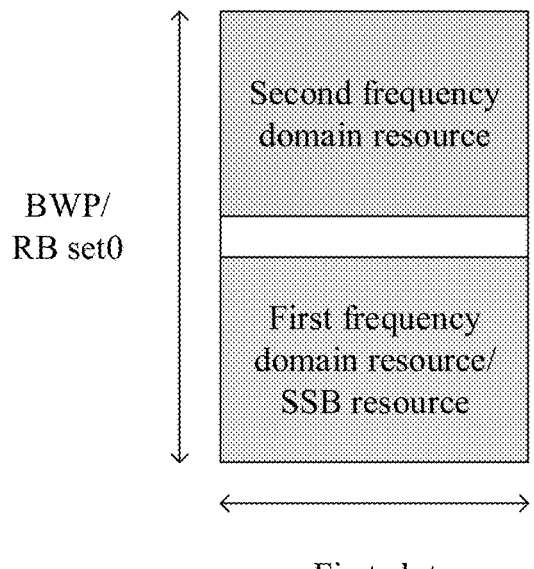
FIG. 9 is a schematic diagram showing a first carrier including a RB set in frequency domain.

Case 2: The first carrier or BWP includes one RB set in the frequency domain, the first frequency domain resource and the second frequency domain resource are frequency-division multiplexed in the RB set. As shown in FIG. 9, the first frequency domain resource is an SSB resource that can be used to transmit the first SSB. Both the first frequency domain resource and the second frequency domain resource are located within a RB set 0 or within the BWP.

The terminal device performs channel detection on the first carrier on the shared spectrum to determine whether the first frequency domain resource and/or the second frequency domain resource is available. In different situations, the behaviors of the terminal device include the following examples.

Case 1: The first carrier or BWP includes at least two RB sets in the frequency domain. In this case, the behavior of the terminal device may include at least one of the following.

Behavior 1: When the terminal device succeeds in LBT on the channel corresponding to the first RB set, the terminal device sends the first SSB through the first frequency domain resource in the first RB set; and/or, when the terminal device succeeds in the LBT on the channel corresponding to the second RB set, the terminal device sends the first channel/first signal through the second frequency domain resource in the second RB set.

When the terminal device fails the LBT on the channel corresponding to the first RB set, the terminal device does not send the first SSB through the first frequency domain resource in the first RB set; and/or, when the terminal device fails the LBT on the channel corresponding to the second RB set, the terminal device does not send the first channel/first signal through the second frequency domain resource in the second RB set.

Behavior 2: When the terminal device succeeds in the LBT on the channel corresponding to the first RB set, the terminal device sends the first SSB through the first frequency domain resource in the first RB set; or, when the terminal device fails the LBT on the channel corresponding to the first RB set, and the terminal device succeeds in the LBT on the channel corresponding to the second RB set, the terminal device sends the first channel/first signal through the second frequency domain resource in the second RB set.

Behavior 3: When the terminal device determines not to send or receive the first SSB on the first slot, and the terminal device succeeds in the LBT on the channel corresponding to the second RB set, the terminal device sends the first channel/first signal through the second frequency domain resources in the second RB set.

When the terminal device determines not to send or receive the first SSB on the first slot, and the terminal device fails the LBT on the channel corresponding to the second RB set, the terminal device does not send the first channel/first signal through the second frequency domain resource in the second RB set.

Case 2: The first carrier or BWP includes one RB set in the frequency domain. In this case, the behavior of the terminal device may include at least one of the following.

When the terminal device determines not to send or receive the first SSB on the first slot, and the terminal device succeeds in the LBT on the channel corresponding to the first RB set, the terminal device sends the first channel/first signal through the second frequency domain resources in the first RB set.

When the terminal device determines not to send or receive the first SSB on the first slot, and the terminal device fails the LBT on the channel corresponding to the first RB set, the terminal device does not send the first channel/first signal through the second frequency domain resource in the first RB set.

In the above cases 1 and 2, that the terminal device determines not to send or receive the first SSB on the first slot may include at least one of the following examples:

(1) Multiple SSB resources used for transmitting the first SSB are included in the same SSB transmission period. The terminal device has already sent the first SSB in a certain SSB resource of the multiple SSB resources, such as the frequency domain resource on a second slot, and the terminal device determines not to receive or send the first SSB on the frequency domain resource of a first slot (other slots than the second slot among the multiple SSB resources).

Figure 10:
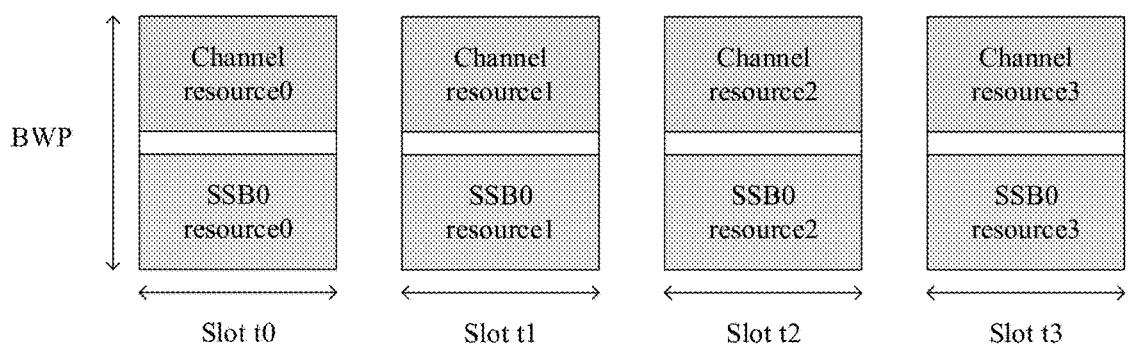
FIG. 10 is a schematic diagram of a plurality of SSB resources used for transmitting one SSB included in a transmission period.

For example, as shown in FIG. 10, multiple SSB resources for transmitting SSB are included in a synchronization signal transmission period, or one SSB resource in a group of paired SSB resources includes multiple transmission resources, such as SSB0 resources 0-3. Assuming that the terminal device has obtained the right to use all the resources in FIG. 10 (or the LBT is successful), the terminal device can send SSB0 through SSB0 resource 0, and transmit the first channel/first signal through at least one channel resource in channel resource 1, channel resource 2 and channel resource 3. Alternatively, the first slot includes at least one of slot t1, slot t2 and slot t3, and the second frequency domain resource includes at least one of channel resource 1, channel resource 2 and channel resource 3. The second slot includes slot t0.

(2) At least two groups of paired SSB resources are included in the same SSB transmission period, and the terminal device does not detect the index of the first SSB on one SSB resource in one group of paired SSB resources, then the terminal device does not need to forward the first SSB on the other SSB resource in the group of paired SSB resources.

Figure 11:
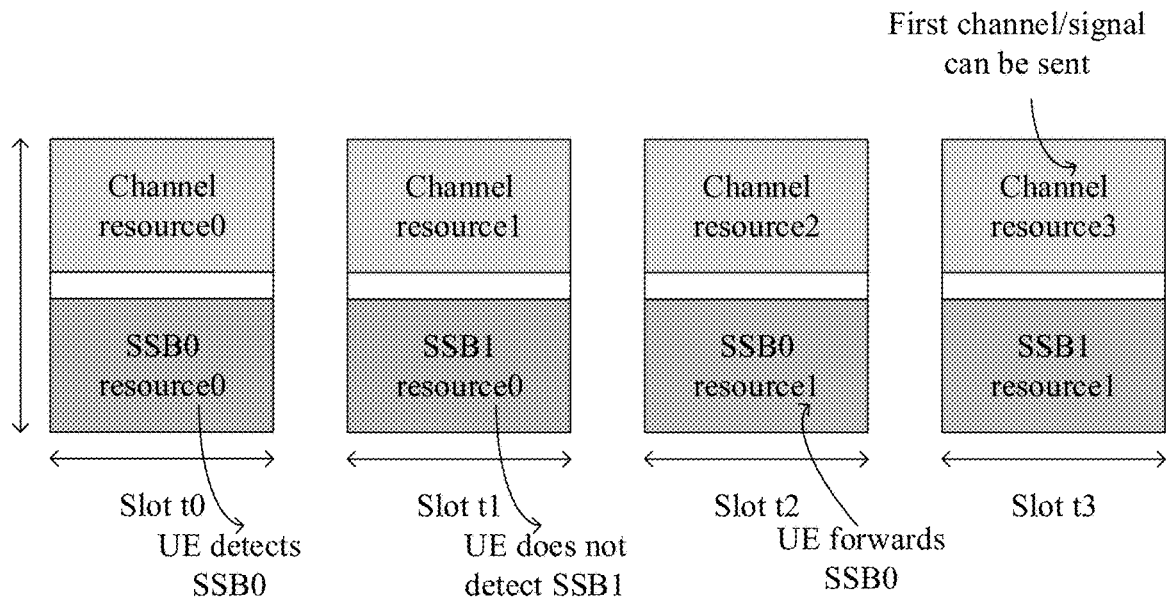
FIG. 11 is a schematic diagram of a plurality of SSB resources used for transmitting a plurality of SSBs included in a transmission period.

For example, as shown in FIG. 11, SSB resources for transmitting a plurality of SSBs such as SSB0 and SSB1 are included in one synchronization signal transmission period, the SSB resource on the slot t0 is paired with the SSB resource on the slot t2, and the SSB resource on the slot t1 is paired with the SSB resource on the slot t3. Assuming that the terminal device detects SSB0 on resource 0 of SSB0, then the terminal device needs to forward SSB0 through resource 1 of SSB0. If the terminal device does not detect SSB1 on resource 0 of SSB1, the terminal device does not need to forward SSB1 through resource 1 of SSB1. Therefore, for the second frequency domain resource, such as channel resource 3, in the slot where resource 1 of SSB1 is located, such as slot t3, the terminal device can transmit the first channel/first signal through the channel resource 3. Alternatively, the first slot includes slot t3, the second frequency domain resource includes channel resource 3, the third slot includes slot t1, and the third frequency domain resource includes resource 0 of SSB1.

(3) The synchronization priority corresponding to the terminal device is the highest, and thus it is not necessary to receive the first SSB on the first slot.

For example, in the system, GNSS has the highest synchronization priority, and if the terminal can obtain synchronization from GNSS, the terminal device is a terminal device with the second highest synchronization priority. Therefore, the terminal device does not need to receive synchronization signals sent from other terminal devices.

In the embodiments of the present disclosure, the frequency domain resources on the SSB slot that are not used for SSB transmission may be used to transmit PSCCH, PSSCH, PSFCH, or the like, thereby improving the resource utilization rate on the shared spectrum.

Figure 12:
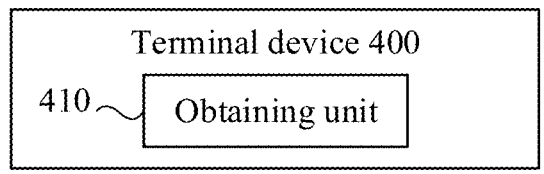
FIG. 12 is a schematic block diagram of a terminal device according to an embodiment of the present disclosure.

FIG. 12 is a schematic block diagram of a terminal device 400 according to an embodiment of the present disclosure. The terminal device 400 may include an obtaining unit 410.

The obtaining unit 410 is configured to obtain frequency domain resource information corresponding to a first slot in a first frequency band.

The first frequency band includes a first carrier or a first bandwidth part (BWP), the first slot corresponds to at least two frequency domain resources, and the at least two frequency domain resources include a first frequency domain resource and a second frequency domain resource, the first frequency domain resource is used for transmission of a first synchronization signal/PBCH block (SSB), and the second frequency domain resource is used for transmission of a first channel or a first signal.

Optionally, in the embodiments of the present disclosure, the first SSB includes a Sidelink SSB (S-SSB).

Optionally, in the embodiments of the present disclosure, the first frequency domain resource and the second frequency domain resource do not overlap in the frequency domain.

Optionally, in the embodiments of the present disclosure, the first frequency band includes a resource block (RB) set in the frequency domain, and the first frequency domain resource and the second frequency domain resource are frequency-division multiplexed in the RB set.

Figure 13:
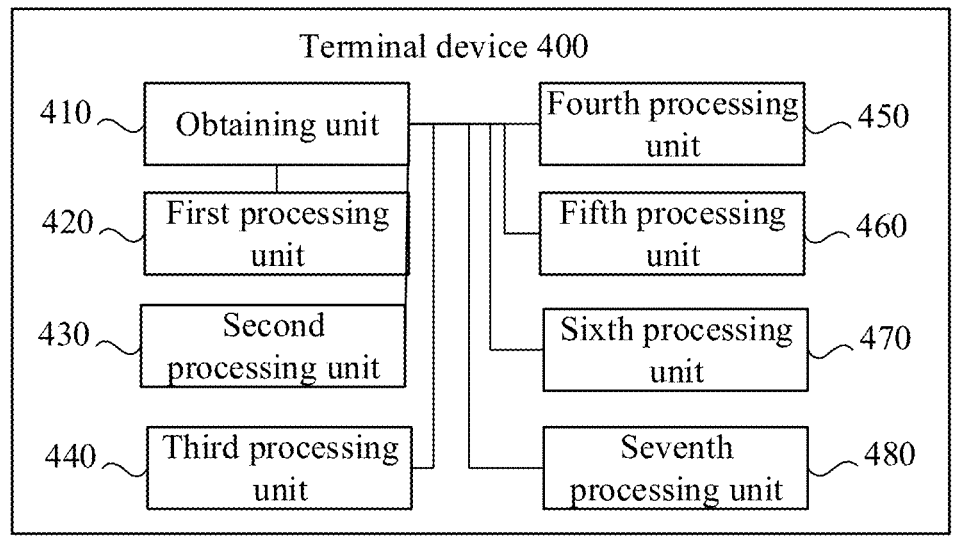
FIG. 13 is a schematic block diagram of a terminal device according to another embodiment of the present disclosure.

Optionally, in the embodiments of the present disclosure, as shown in FIG. 13, the terminal device further includes a first processing unit 420, and the first processing unit is configured to:
  send the first channel or the first signal through the second frequency domain resource in the RB set when the terminal device determines not to send or receive the first SSB on the first slot and the terminal device succeeds in channel detection on a channel corresponding to the RB set, or
  not send the first channel or the first signal through the second frequency domain resource in the RB set when the terminal device determines not to send or receive the first SSB on the first slot and the terminal device fails the channel detection on the channel corresponding to the RB set.

Optionally, in the embodiments of the present disclosure, the first frequency band includes at least two RB sets in the frequency domain, the at least two RB sets include a first RB set and a second RB set, the first frequency domain resource is located in the first RB set, and the second frequency domain resource is located in the second RB set.

Optionally, in the embodiments of the present disclosure, the terminal device further includes a second processing unit 430, and the second processing unit is configured to perform at least one of the following:
  send the first SSB through the first frequency domain resource in the first RB set when the terminal device succeeds in channel detection on a channel corresponding to the first RB set;
  send the first channel or the first signal through the second frequency domain resource in the second RB set when the terminal device succeeds in the channel detection on a channel corresponding to the second RB set.

Optionally, in the embodiments of the present disclosure, the terminal device further includes a third processing unit 440, and the third processing unit is configured to perform at least one of the following:
  not send the first SSB through the first frequency domain resource in the first RB set when the terminal device fails the channel detection on the channel corresponding to the first RB set;
  not send the first channel or the first signal through the second frequency domain resource in the second RB set when the terminal device fails the channel detection on the channel corresponding to the second RB set.

Optionally, in the embodiments of the present disclosure, the terminal device further includes a fourth processing unit 450, and the fourth processing unit is configured to:
  send the first SSB through the first frequency domain resource in the first RB set when the terminal device succeeds in the channel detection on the channel corresponding to the first RB set; or
  send the first channel or the first signal through the second frequency domain resource in the second RB set when the terminal device fails the channel detection on the channel corresponding to the first RB set and the terminal device succeeds in the channel detection on the channel corresponding to the second RB set.

Optionally, in the embodiments of the present disclosure, the terminal device further includes a fifth processing unit 460, and the fifth processing unit is configured to:
  send the first channel or the first signal through the second frequency domain resource in the second RB set when the terminal device determines not to send or receive the first SSB on the first slot and the terminal device succeeds in the channel detection on the channel corresponding to the second RB set.

Optionally, in the embodiments of the present disclosure, the terminal device further includes a sixth processing unit 470, and the sixth processing unit is configured to:
  send the first channel or the first signal through the second frequency domain resource when the terminal device determines not to send or receive the first SSB on the first slot and the terminal device succeeds in the channel detection in the first frequency band; or,
  not send the first channel or the first signal through the second frequency domain resource when the terminal device determines not to send or receive the first SSB on the first slot and the terminal device fails the channel detection in the first frequency band.

Optionally, in the embodiments of the present disclosure, the terminal device further includes a seventh processing unit 480, and the seventh processing unit is configured to:
  send the first channel or the first signal through the second frequency domain resource when the terminal device determines not to send or receive the first SSB on the first slot; or,
  not send the first channel or the first signal through the second frequency domain resource when the terminal device determines to send or receive the first SSB on the first slot.

Optionally, in the embodiments of the present disclosure, the terminal device determines not to send or receive the first SSB on the first slot, including at least one of the following:
  the terminal device sends or receives the first SSB through a second slot, where the second slot and the first slot belong to the same SSB transmission period;
  the terminal device does not detect the first SSB on a third frequency domain resource on a third slot, where the third frequency domain resource and the first frequency domain resource include paired SSB resources, and the third slot and the first slot belong to the same SSB transmission period.

Optionally, in the embodiments of the present disclosure, that the terminal device determining not to send or receive the first SSB on the first slot further includes that the terminal device corresponds to a highest synchronization priority, or the terminal device is a terminal device that has a second highest synchronization priority.

Optionally, the second slot includes a second slot on the first frequency band as described above.

Optionally, the third slot includes a third slot on the first frequency band as described above.

Optionally, in the embodiments of the present disclosure, the first channel includes at least one of a physical sidelink control channel (PSCCH), a physical sidelink shared channel (PSSCH), a physical sidelink feedback channel (PSFCH), a physical uplink control channel (PUCCH), a physical uplink shared channel (PUSCH), and a physical random access channel (PRACH).

Optionally, in the embodiments of the present disclosure, the first frequency band includes the first carrier on a shared spectrum, or the first frequency band includes the first BWP on the shared spectrum.

The terminal device 400 in the embodiments of the present disclosure can implement the corresponding functions of the terminal device in the foregoing method embodiments. For the corresponding processes, functions, implementations, and beneficial effects of each module (sub-module, unit, component, etc.) in the terminal device 400, reference can be made to the corresponding description in the embodiments of the method 200, which are not repeated here.

It should be noted that the functions described with respect to the modules (sub-modules, units, components, etc.) in the terminal device 400 of the embodiments of the present disclosure may be implemented by different modules (sub-modules, units, or components, etc.), or may be implemented by the same module (sub-module, unit, component, etc.).

Figure 14:
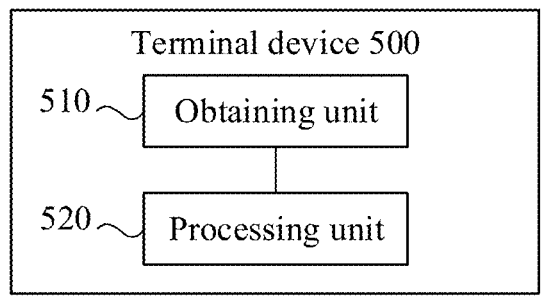
FIG. 14 is a schematic block diagram of a terminal device according to another embodiment of the present disclosure.

FIG. 14 is a schematic block diagram of a terminal device 500 according to an embodiment of the present disclosure. The terminal device 500 may include an obtaining unit 510 and a processing unit 520.

The obtaining unit 510 is configured to obtain frequency domain resource information corresponding to a first slot in a first frequency band.

The first frequency band includes a first carrier or a first bandwidth part (BWP), the first slot corresponds to at least two frequency domain resources, and the at least two frequency domain resources includes a first frequency domain resource and a second frequency domain resource, the first frequency domain resource is used for transmission of a first synchronization signal/PBCH block (SSB), and the second frequency domain resource is used for transmission of a first channel or a first signal.

The processing unit 520 is configured to detect the first SSB through the first frequency domain resource, and/or receive the first channel or the first signal through the second frequency domain resource.

Optionally, in the embodiments of the present disclosure, the first SSB includes a Sidelink SSB (S-SSB).

Optionally, in the embodiments of the present disclosure, the first frequency domain resource and the second frequency domain resource do not overlap in the frequency domain.

Optionally, in the embodiments of the present disclosure, the first frequency band includes a resource block (RB) set in the frequency domain, and the first frequency domain resource and the second frequency domain resource are frequency-division multiplexed in the RB set.

Optionally, in the embodiments of the present disclosure, the first frequency band includes at least two RB sets in the frequency domain, the at least two RB sets include a first RB set and a second RB set, the first frequency domain resource is located in the first RB set, and the second frequency domain resource is located in the second RB set.

Optionally, in the embodiments of the present disclosure, the first channel includes at least one of a physical sidelink control channel (PSCCH), a physical sidelink shared channel (PSSCH), a physical sidelink feedback channel (PSFCH), a physical uplink control channel (PUCCH), a physical uplink shared channel (PUSCH), and a physical random access channel (PRACH).

Optionally, in the embodiments of the present disclosure, the first frequency band includes the first carrier on a shared spectrum, or the first frequency band includes the first BWP on the shared spectrum.

The terminal device 500 in the embodiments of the present disclosure can implement the corresponding functions of the network device in the foregoing method embodiments. For the corresponding processes, functions, implementations, and beneficial effects of the modules (sub-modules, units, components, etc.) in the terminal device 500, reference can be made to the corresponding description in the embodiments of the method 300, which are not repeated here.

It should be noted that the functions described with respect to the modules (sub-modules, units, components, etc.) in the terminal device 500 of the embodiments of the present disclosure may be implemented by different modules (sub-modules, units, or components, etc.), or may be implemented by the same module (sub-module, unit, component, etc.).

Figure 15:
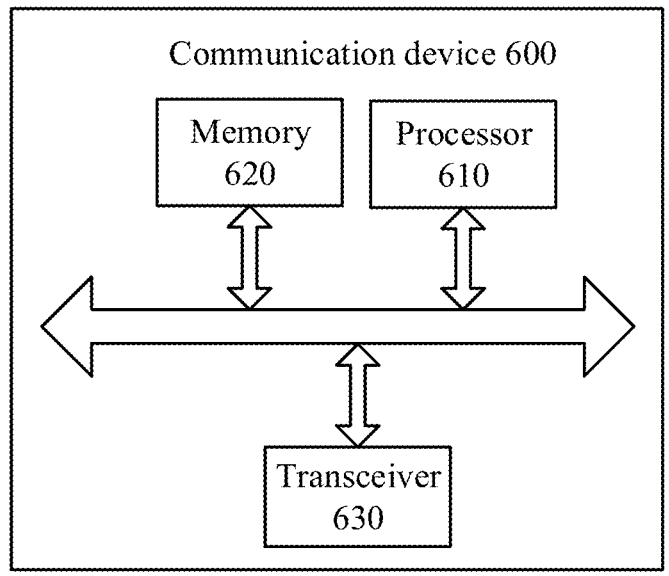
FIG. 15 is a schematic block diagram of a communication device according to an embodiment of the present disclosure.

FIG. 15 is a schematic structural diagram of a communication device 600 according to an embodiment of the present disclosure. The communication device 600 includes a processor 610, and the processor 610 can call and run a computer program from a memory, to cause the communication device 600 to carry out the methods in the embodiments of the present disclosure.

Optionally, as shown in FIG. 15, the communication device 600 can further include a memory 620. The processor 610 can call and run the computer program from the memory 620 to cause the communication device 600 to implement the methods in the embodiments of the present disclosure.

The memory 620 can be a separate device independent of the processor 610, or can be integrated in the processor 610.

Optionally, as shown in FIG. 15, the communication device 600 can further include a transceiver 630, and the processor 610 can control the transceiver 630 to communicate with other devices, and specifically, to transmit information or data to other devices, or to receive information or data transmitted from other devices.

The transceiver 630 can include a transmitter and a receiver. The transceiver 630 can further include an antenna, and the number of the antennas can be one or more.

Optionally, the communication device 600 can be the network device in the embodiments of the present disclosure, and the communication device 600 can carry out the corresponding processes which are implemented by the network device in the methods of the embodiments of the present disclosure, which will not be repeated here for the sake of brevity.

Optionally, the communication device 600 can be the terminal device in the embodiments of the present disclosure, and the communication device 600 can carry out the corresponding processes which are implemented by the terminal device in the methods of the embodiments of the present disclosure, which will not be repeated here for the sake of brevity.

Figure 16:
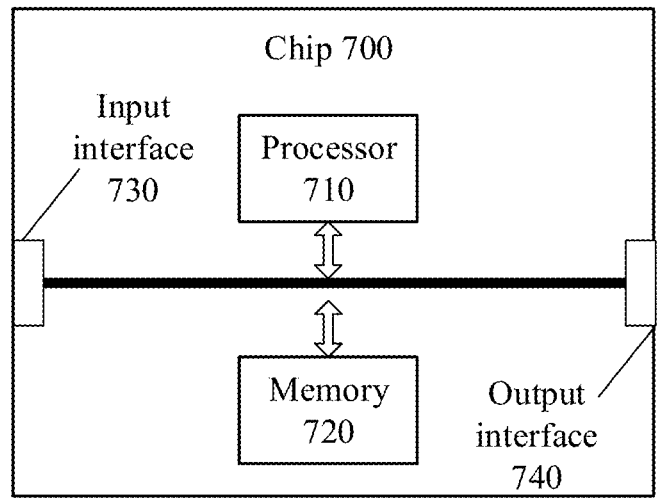
FIG. 16 is a schematic block diagram of a chip according to an embodiment of the present disclosure.

FIG. 16 is a schematic structural diagram of a chip 700 according to an embodiment of the present disclosure. The chip 700 includes a processor 710 which can call and run a computer program from a memory to implement the methods in the embodiments of the present disclosure.

Optionally, as shown in FIG. 16, the chip 700 may further include a memory 720. The processor 710 may call and run a computer program from the memory 720 to implement the methods performed by the terminal device or the network device in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and specifically, to obtain information or data transmitted by other devices or chips.

Optionally, the chip 700 can further include an output interface 740. The processor 710 can control the output interface 740 to communicate with other devices or chips, and specifically, to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the terminal device in the embodiments of the present disclosure, and the chip can carry out the corresponding processes which are implemented by the terminal device in the methods of the embodiments of the present disclosure, which will not be repeated here for the sake of brevity.

The chip applied to the network device and the chip applied to the terminal device can be the same chip or different chips.

It should be understood that the chip mentioned in the embodiments of the present disclosure can also be referred to as a system-level chip, a system chip, a chip system, or a system-on-chip.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor.

The memory mentioned above may be either volatile memory or non-volatile memory, or may include both volatile and non-volatile memories. The non-volatile memory may be a read-only memory (ROM), a programmable read-only memory (PROM), an erasable programmable read-only memory (EPROM), an electrically programmable erase programmable read-only memory (electrically EPROM, EEPROM) or a flash memory. The volatile memory may be a random access memory (RAM).

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), among others. That is to say, the memory in the embodiments of the present disclosure is intended to include but is not limited to these and any other suitable types of memories.

Figure 17:
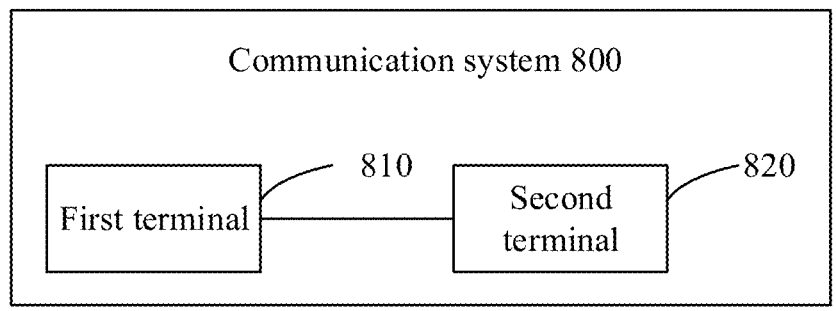
FIG. 17 is a schematic block diagram of a communication system according to an embodiment of the present disclosure.

FIG. 17 is a schematic block diagram of a communication system 800 according to an embodiment of the present disclosure. The communication system 800 includes a first terminal 810 and a second terminal 820. The first terminal 810 is configured to obtain frequency domain resource information corresponding to a first slot in a first frequency band. The first frequency band includes a first carrier or a first bandwidth part (BWP), the first slot corresponds to at least two frequency domain resources, and the at least two frequency domain resources include a first frequency domain resource and a second frequency domain resource, the first frequency domain resource is used to transmit a first synchronization signal/PBCH block (SSB), and the second frequency domain resource is used to transmit a first channel or a first signal. The second terminal 820 is configured to obtain the frequency domain resource information corresponding to the first slot in the first frequency band; and detect the first SSB through the first frequency domain resource, and/or receive the first channel or the first signal through the second frequency domain resource. The first terminal 810 can be configured to implement the corresponding functions in the above method 200, and the second terminal 820 can be configured to implement the corresponding functions in the above method 300. For the sake of brevity, details are not repeated here.

The above embodiments may be implemented entirely or partly by software, hardware, firmware or any combination thereof. When implemented by software, it can be implemented entirely or partly in the form of a computer program product. The computer program product includes one or more computer instructions. When the computer program instructions are loaded and executed on the computer, the processes or functions in accordance with the embodiments of the present disclosure are entirely or partly generated. The computer can be a general-purpose computer, a dedicated computer, a computer network, or other programmable devices. The computer instructions can be stored in a computer-readable storage medium, or transmitted from one computer-readable storage medium to another. For example, the computer instructions can be transmitted from a website, a computer, a server, or a data center to another website site, computer, server or data center in a wired manner such as through a coaxial cable, an optical fiber or a digital subscriber line (DSL) or in a wireless manner such as an infrared, wireless, microwave manner or the like. A computer-readable storage medium may be any available medium that can be accessed by a computer or a data storage device such as a server or data center integrated with one or more available media. The available medium may be a magnetic medium (such as a floppy disk, a hard disk, a magnetic tape), an optical medium (such as a DVD), or a semiconductor medium (such as a solid state disk (SSD)).

In the embodiments of the present disclosure, the first slot in the first frequency band corresponds to at least two frequency domain resources, the first frequency domain resource is used to transmit the first SSB, and the second frequency domain resource is used to transmit the first channel or the first signal, therefore, other channels or signals can be transmitted on the frequency domain resources that are not used for SSB transmission on the first slot, thereby improving the resource utilization rate of wireless communication.

It should be understood that in the embodiments of the present disclosure, the sequence numbers of the above-mentioned processes do not mean the performing order, and the performing order of the processes should be determined according to the functions and the internal logic thereof, and should not compose any limitation on the implementations of the embodiments of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A wireless communication method, comprising:
   obtaining, by a terminal device, frequency domain resource information corresponding to a first slot in a first frequency band,
   wherein the first frequency band comprises a first carrier or a first bandwidth part (BWP), the first slot corresponds to at least two frequency domain resources, the at least two frequency domain resources comprise a first frequency domain resource and a second frequency domain resource, the first frequency domain resource is used for transmission of a first synchronization signal/PBCH block (SSB), and the second frequency domain resource is used for transmission of a first channel or a first signal;
   wherein the first frequency band comprises at least two RB sets in frequency domain, the at least two RB sets comprise a first RB set and a second RB set, the first frequency domain resource is located in the first RB set, and the second frequency domain resource is located in the second RB set, and
   wherein the method further comprises at least one of the following:
      not sending, by the terminal device, the first SSB through the first frequency domain resource in the first RB set when the terminal device fails channel detection on a channel corresponding to the first RB set; or
      not sending, by the terminal device, the first channel or the first signal through the second frequency domain resource in the second RB set when the terminal device fails channel detection on a channel corresponding to the second RB set.

2. The method according to claim 1, wherein the first SSB comprises a sidelink SSB.

3. The method according to claim 1, wherein the first frequency domain resource and the second frequency domain resource do not overlap in frequency domain.

4. The method according to claim 1, wherein the first frequency band comprises a resource block (RB) set in frequency domain, and the first frequency domain resource and the second frequency domain resource are frequency-division multiplexed within the RB set.

5. The method according to claim 4, further comprising:
   sending, by the terminal device, the first channel or the first signal through the second frequency domain resource in the RB set when the terminal device determines not to send or receive the first SSB on the first slot and the terminal device succeeds in channel detection on a channel corresponding to the RB set; or
   not sending, by the terminal device, the first channel or the first signal through the second frequency domain resource in the RB set when the terminal device determines not to send or receive the first SSB on the first slot and the terminal device fails the channel detection on the channel corresponding to the RB set.

6. The method according to claim 1, wherein the method further comprises at least one of the following:
   sending, by the terminal device, the first SSB through the first frequency domain resource in the first RB set when the terminal device succeeds in channel detection on a channel corresponding to the first RB set; or
   sending, by the terminal device, the first channel or the first signal through the second frequency domain resource in the second RB set when the terminal device succeeds in channel detection on a channel corresponding to the second RB set.

7. The method according to claim 1, further comprising:
   sending, by the terminal device, the first SSB through the first frequency domain resource in the first RB set when the terminal device succeeds in channel detection on a channel corresponding to the first RB set; or
   sending, by the terminal device, the first channel or the first signal through the second frequency domain resource in the second RB set when the terminal device fails the channel detection on the channel corresponding to the first RB set and the terminal device succeeds in channel detection on a channel corresponding to the second RB set.

8. The method according to claim 1, further comprising:
   sending, by the terminal device, the first channel or the first signal through the second frequency domain resource in the second RB set when the terminal device determines not to send or receive the first SSB on the first slot and the terminal device succeeds in channel detection on a channel corresponding to the second RB set.

9. The method according to claim 1, further comprising:
   sending, by the terminal device, the first channel or the first signal through the second frequency domain resource when the terminal device determines not to send or receive the first SSB on the first slot and the terminal device succeeds in channel detection in the first frequency band; or,
   not sending, by the terminal device, the first channel or the first signal through the second frequency domain resource when the terminal device determines not to send or receive the first SSB on the first slot and the terminal device fails the channel detection in the first frequency band.

10. The method according to claim 1, further comprising:
    sending, by the terminal device, the first channel or the first signal through the second frequency domain resource when the terminal device determines not to send or receive the first SSB on the first slot; or,
    not sending, by the terminal device, the first channel or the first signal through the second frequency domain resource when the terminal device determines to send or receive the first SSB on the first slot.

11. The method according to claim 5, wherein that the terminal device determines not to send or receive the first SSB on the first slot comprises at least one of the following:
- the terminal device sends or receives the first SSB through a second slot, wherein the second slot and the first slot belong to the same SSB transmission period; or
- the terminal device does not detect the first SSB on a third frequency domain resource on a third slot, wherein the third frequency domain resource and the first frequency domain resource comprise paired SSB resources, and the third slot and the first slot belong to the same SSB transmission period.

12. The method according to claim 5, wherein that the terminal device determines not to send or receive the first SSB on the first slot further comprises that the terminal device corresponds to a highest synchronization priority.

13. The method according to claim 1, wherein the first channel comprises at least one of a Physical Sidelink Control Channel (PSCCH), a Physical Sidelink Shared Channel (PSSCH), a Physical Sidelink Feedback Channel (PSFCH), a Physical Uplink Control Channel (PUCCH), a Physical Uplink Shared Channel (PUSCH), and a Physical Random Access Channel (PRACH).

14. The method according to claim 1, wherein the first frequency band comprises the first carrier on a shared spectrum, or the first frequency band comprises the first BWP on the shared spectrum.

15. A terminal device, comprising:
- a processor; and
- a memory configured to store a computer program executable by the processor,
- wherein the processor is configured to execute the computer program stored in the memory to cause the terminal device to obtain frequency domain resource information corresponding to a first slot in a first frequency band,
- wherein the first frequency band comprises a first carrier or a first bandwidth part (BWP), the first slot corresponds to at least two frequency domain resources, the at least two frequency domain resources comprise a first frequency domain resource and a second frequency domain resource, the first frequency domain resource is used for transmission of a first synchronization signal/PBCH block (SSB), and the second frequency domain resource is used for transmission of a first channel or a first signal,
- wherein the first frequency band comprises at least two RB sets in frequency domain, the at least two RB sets comprise a first RB set and a second RB set, the first frequency domain resource is located in the first RB set, and the second frequency domain resource is located in the second RB set, and
- wherein the terminal device is further caused to perform at least one of the following:
  - not sending the first SSB through the first frequency domain resource in the first RB set when the terminal device fails channel detection on a channel corresponding to the first RB set; or
  - not sending the first channel or the first signal through the second frequency domain resource in the second RB set when the terminal device fails channel detection on a channel corresponding to the second RB set.

* * * * *